US006957198B2

(12) United States Patent
Kumhyr

(10) Patent No.: US 6,957,198 B2
(45) Date of Patent: Oct. 18, 2005

(54) USE OF PERSONA OBJECT IN ELECTRONIC TRANSACTIONS

(75) Inventor: David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 841 days.

(21) Appl. No.: 09/731,628

(22) Filed: Dec. 7, 2000

(65) Prior Publication Data

US 2002/0073041 A1 Jun. 13, 2002

(51) Int. Cl.⁷ .............................................. G06F 17/60
(52) U.S. Cl. ........................................ 705/64; 705/10
(58) Field of Search .............................. 705/10, 26–27, 705/64, 67–70; 707/1–6, 9–10, 100–104; 709/201–203

(56) References Cited

U.S. PATENT DOCUMENTS

| | | | |
|---|---|---|---|
| 5,802,292 A | 9/1998 | Mogul | 395/200.33 |
| 5,819,285 A | 10/1998 | Damico et al. | 707/104 |
| 5,828,837 A | 10/1998 | Eikeland | 395/200.32 |
| 5,963,915 A | 10/1999 | Kirsch | 705/26 |
| 5,991,735 A * | 11/1999 | Gerace | 705/10 |
| 6,079,621 A | 6/2000 | Vardanyan et al. | 235/487 |
| 6,125,352 A * | 9/2000 | Franklin et al. | 705/26 |
| 6,141,010 A * | 10/2000 | Hoyle | 345/356 |
| 6,285,983 B1 * | 9/2001 | Jenkins | 705/10 |
| 6,405,245 B1 * | 6/2002 | Burson et al. | 709/217 |
| 6,415,322 B1 * | 7/2002 | Jaye | 709/224 |
| 6,460,036 B1 * | 10/2002 | Herz | 707/10 |
| 6,477,575 B1 * | 11/2002 | Koeppel et al. | 709/224 |
| 6,487,538 B1 * | 11/2002 | Gupta et al. | 705/14 |

FOREIGN PATENT DOCUMENTS

| | | | |
|---|---|---|---|
| JP | 11161670 A * | 6/1999 | G06F/17/30 |
| WO | WO 99/18514 | 4/1999 | |
| WO | WO 99/46691 | 9/1999 | |

OTHER PUBLICATIONS

Young et al., User Profile Based Personalized Web Agent, Dec. 1999, World Scientific, Singapore, ISBN: 981 02 4054 6.*

* cited by examiner

Primary Examiner—Mary Cheung
(74) Attorney, Agent, or Firm—Robert A. Voight, Jr.; Jeffrey S. LaBaw

(57) ABSTRACT

A method, system and computer program product for controlling information gathered by data collection agencies in an electronic transaction. A persona facet may be selected by a user of a client in a network system where the selected persona facet comprises user selectable information, e.g., name, e-mail address, unique key, public key, private key, payment method, consumer resource data, that may be exposed in the electronic transaction. The user may then connect to a web site via a web browser. Upon initiating an electronic transaction, the user may send the selected persona facet to the web site. If the web site recognizes the persona facet, then the user may request the web site to send the information about the user stored in a database, e.g., consumer resource management database. If the web site sends the information, then the user may compare the received information with the user selectable information in the selected persona facet. If there are any differences between the received information and the user selectable information in the selected persona facet, then the database, e.g., consumer resource management database, may be updated to include only the user selectable information. By updating the database, e.g., consumer resource management database, the information gathered by data collection agencies and distributed to marketers may be more accurate as well as limited according to the user's wishes.

36 Claims, 4 Drawing Sheets

USE OF PERSONA OBJECT IN ELECTRONIC TRANSACTIONS

TECHNICAL FIELD

The present invention relates to the field of electronic transactions, and more particularly to transmitting the core or a facet of a persona object during an electronic transaction that enables the user purchasing via the Internet to have more control over the information gathered regarding the electronic transaction by data collection agencies.

BACKGROUND INFORMATION

The World Wide Web is a collection of servers connected to the Internet that utilizes the Hypertext Transfer Protocol ("HTTP"). HTTP is a known application protocol that provides users with access to documents (e.g., web pages at a web site) written in a standard mark-up page description language known as Hypertext Markup Language ("HTML"). HTTP is used to transmit HTML web pages between a remote computer, i.e., a server, and a client computer in a form that is understandable to browser software, e.g., Netscape Navigator™, executing on the client computer.

A web site may be customized to a specific user of a client computer (hereinafter "client") when information about that client is available to the site. For example, if a web site has access to a record indicating that a client is a sports fan, then the site may be specially configured to display a sports advertisement whenever that client accesses the site. Such functionality can encourage sports sponsors for the web site, consequently increasing site revenue.

To that end, the World Wide Web may utilize "cookies" to provide client information, e.g., user's regular interest or buying habits, to a web site. As is known in the art, a cookie is a data block that is transmitted to a client browser by a web site. Upon receipt, the browser stores the cookie in a given manner such as, for example, in a text file called "cookie.txt." The cookie may then be transmitted back to the web site each time the browser requests access to a web page from the web site.

The data included in the cookies may then be gathered by data collection agencies and stored in a database. For example, if a user purchased vintage baseball cards on a web site that sold collectibles, then the cookies may include information such as the name of the individual purchasing the vintage baseball cards, the individual's credit card number, the individual's address and home phone number, the individual's work phone number, as well as the particular type of baseball cards purchased and the amount purchased. The information may then be sold to marketers who use the information to solicit appropriate sales literature, e.g., baseball cards, to the individual. However, the individual may not want marketers to obtain such information.

Furthermore, the data in the cookies that are used to deduce the user's interest or buying habits may be inaccurate. For example, a user may be researching Islamic holidays on the Internet because of a school project. Marketers may then make improper deducements from the cookie data, e.g., the user is an Islamic fundamentalist and would like literature on how to join Islamic fundamentalist political parties and organizations.

It would therefore be desirable to develop a system and method whereby data gathered by data collection agencies and distributed to marketers are more accurate. It would further be desirable to develop a system and method that limits the information that may become available to data collection agencies and sold to marketers if the user wishes.

SUMMARY

The problems outlined above may at least in part be solved in some embodiments by a user of a client in a network system sending a particular persona facet comprising user selectable information to the web site during the electronic transaction. A persona facet may be characterized as a facet of a persona object representing a facet of an individual's personalities, traits or interests. Upon the web site recognizing the particular persona facet, the user may request the web site to send information, e.g., information used to deduce the user's interest or buying habits, about the user stored in a database, e.g., consumer resource management database. Upon receipt of the information about the user from the web site, a comparison may then be made between the received information from the web site and the user selectable information in the particular persona facet. If there are any differences, the database, e.g., consumer resource management database, may then be updated so that the database, e.g., consumer resource management database, only includes the user selected information.

In one embodiment, a method for controlling information gathered by data collection agencies in an electronic transaction comprises the step of selecting a persona facet where the selected persona facet comprises user selectable information, e.g., name, e-mail address, unique key, public key, private key, payment method, consumer resource data, that will be exposed in the electronic transaction. The user of a client in a network system may then connect to a web site via a web browser. Upon initiating an electronic transaction, the user may send the selected persona facet to the web site. If the web site recognizes the persona facet, then the user may request the web site to send the information about the user stored in a database, e.g., consumer resource management database. If the web site sends the information, then the user may compare the received information with the user selectable information in the selected persona facet. If there are any differences between the received information and the user selectable information in the selected persona facet, then the database, e.g., consumer resource management database, may then be updated to include only the user selectable information. By updating the database, e.g., consumer resource management database, the information gathered by data collection agencies and distributed to marketers may be more accurate as well as limited according to the user's wishes. Upon updating the database, e.g., consumer resource management database, the electronic transaction may be completed.

In another embodiment of the present invention, the electronic transaction may be completed by the web browser initiating a method call to the web site to expose the particular method of payment, e.g., credit card number. In this manner, the user does not send the particular payment method, e.g., credit card number, over the Internet, thereby improving secrecy and reducing chances of fraud and identity theft.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for controlling information gathered by data collection agencies in an electronic transaction. In one embodiment of the present invention, a method comprises the step of selecting a persona facet by a user of a client in a network system where the selected persona facet comprises user selectable information, e.g., name, e-mail address, unique key, public key, private key, payment method, consumer resource data, that will be exposed in the electronic transaction. The user may then connect to a web site via a web browser. Upon initiating an electronic transaction, the user may send the selected persona facet to the web site. If the web site recognizes the persona facet, then the user may request the web site to send the information about the user stored in a database, e.g., consumer resource management database. If the web site sends the information, then the user may compare the received information with the user selectable information in the selected persona facet. If there are any differences between the received information and the user selectable information in the selected persona facet, then the database, e.g., consumer resource management database, may then be updated to include only the user selectable information. By updating the database, e.g., consumer resource management database, the information gathered by data collection agencies and distributed to marketers may be more accurate as well as limited according to the user's wishes. Upon updating the database, e.g., consumer resource management database, the electronic transaction may be completed. In another embodiment of the present invention, the electronic transaction may be completed by the web browser initiating a method call to the web site to expose the particular method of payment, e.g., credit card number. In this manner, the user does not send the particular payment method, e.g., credit card number, over the Internet, thereby improving secrecy and reducing chances of fraud and identity theft.

Figure 1:
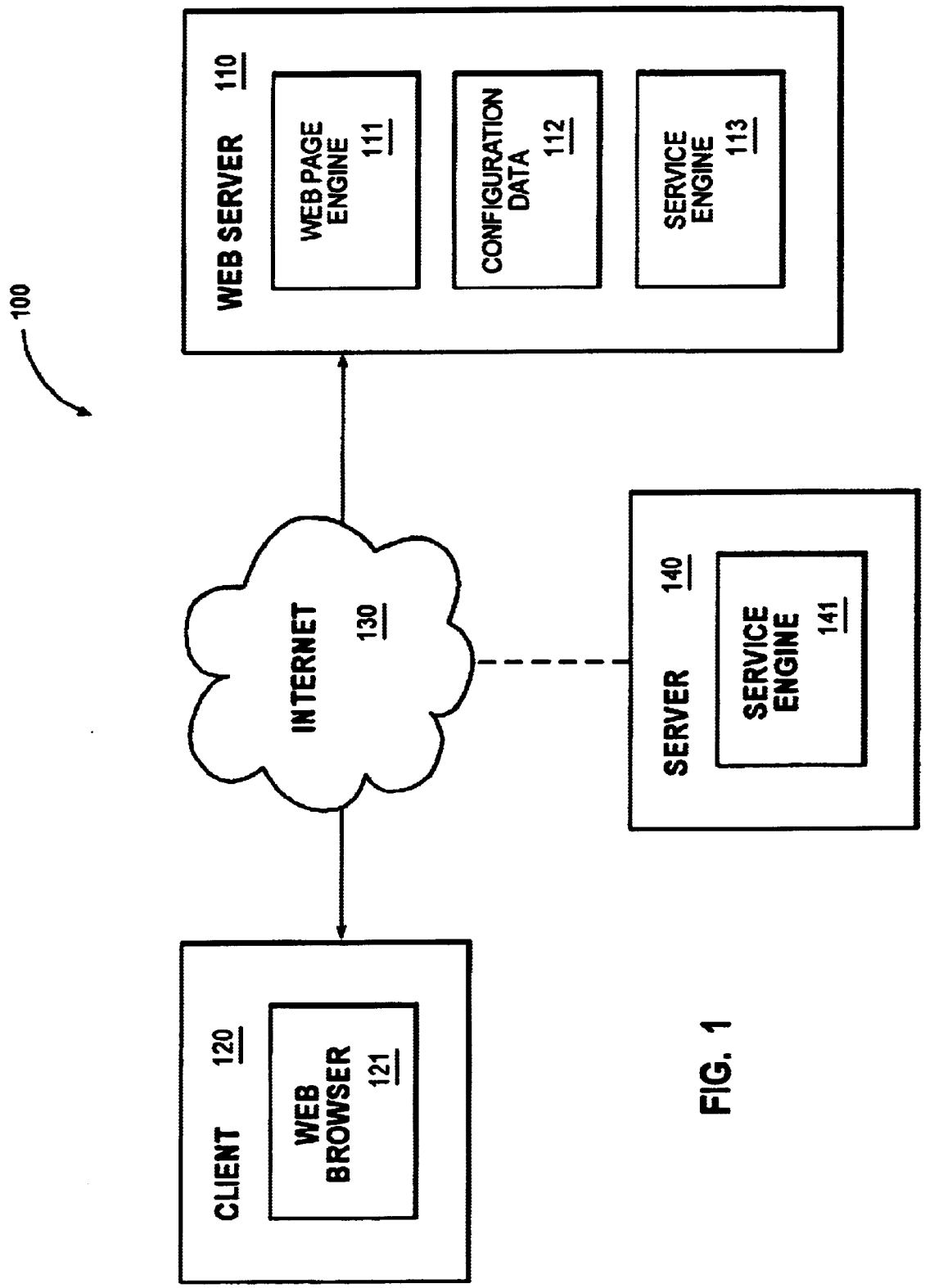
FIG. 1 illustrates a network in accordance with the present invention.

FIG. 1—Network System

FIG. 1 illustrates an embodiment of the present invention of a network system 100. Network system 100 comprises a web server 110 connected to a client 120 via the Internet 130. The Internet 130 may refer to a network of computers. It is noted that network system 100 may comprise a plurality of clients 120 connected to web server 110 via the Internet 130 and that FIG. 1 is used for illustrative purposes.

Client 120 comprises a client engine, e.g., web browser 121, which may be configured for communicating with the Internet 130. As stated in the Background Information section, a cookie is a data block that is transmitted to web browser 121 by a web site. Upon receipt, web browser 121 stores the cookie in a given manner such as, for example, in a text file called "cookie.txt." The cookie may then be transmitted back to the web site each time browser 121 requests access to a web page from the web site.

Web server 110 may comprise a web page engine 111 for maintaining and providing access to an Internet web page which is enabled to forward the web page to the web browser 121 of client 120. Web server 110 further comprises configuration data 112. Configuration data 112 may be downloaded by client 120 to gain access to the desired service and to configure the functionality of web browser 121. Configuration data 112 may include operating system settings, e.g., TCP protocol data and the domain name server address, user preferences, bookmarks, services, service addresses. Each user may preferably upload unique configuration data 112 to web server 110 in order to obtain similar functionality from any web browser 121.

Web server 110 may further comprise a service engine 113 for providing access to a computer service. System 100 may further comprise a server 140 including a service engine 141 for providing access to a second computer service.

FIG. 2—Client

Figure 2:
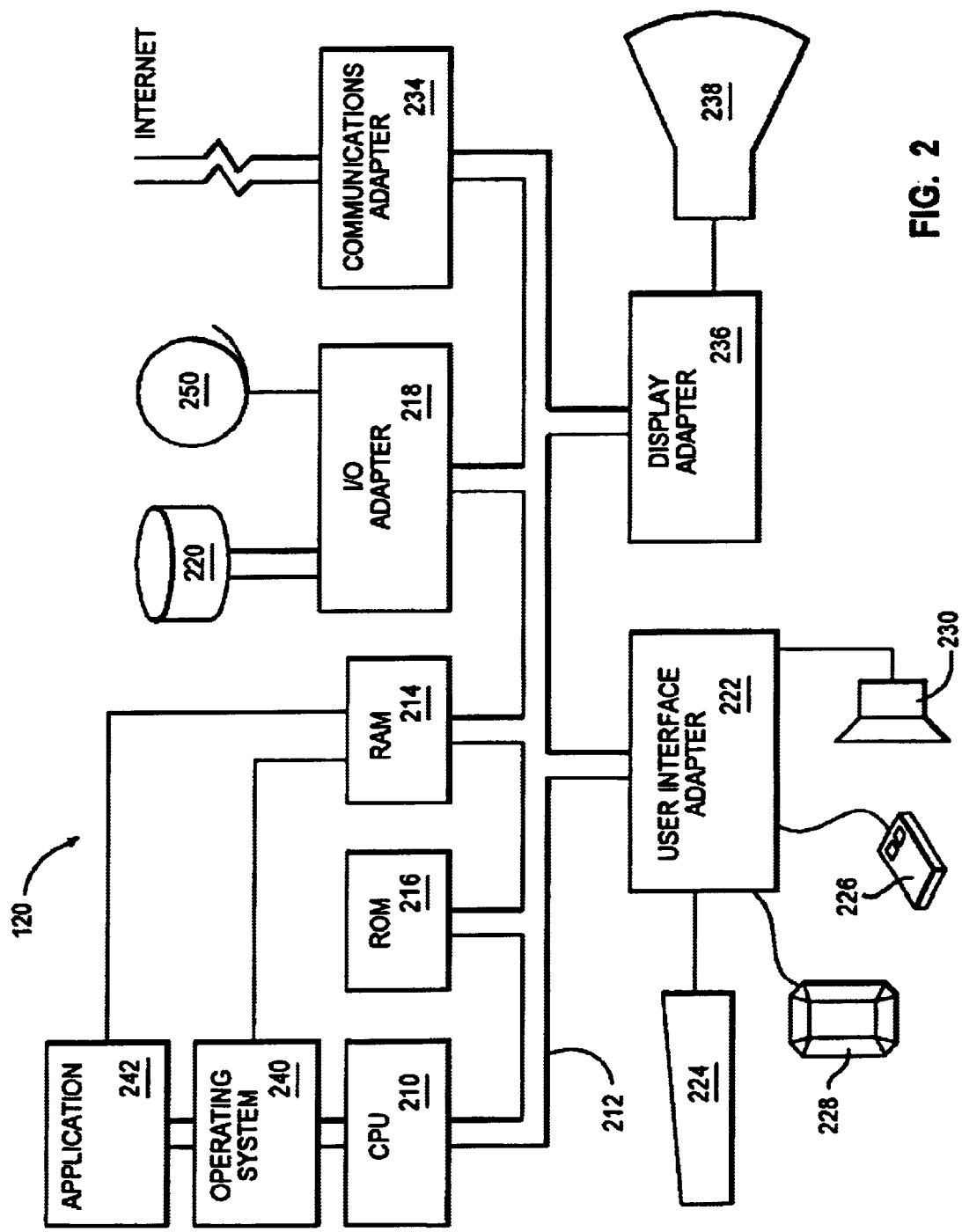
FIG. 2 illustrates an embodiment of a client in a network system configured in accordance with the present invention.

FIG. 2 illustrates a typical hardware configuration of client 120 is representative of a hardware environment for practicing the present invention. Client 120 has a central processing unit (CPU) 210, such as a conventional microprocessor, coupled to various other components by system bus 212. An operating system 240, e.g., DOS, OS/2™, runs on CPU 210 and provides control and coordinates the function of the various components of FIG. 2. Application 242, e.g., program for controlling information gathered by data collection agencies in an electronic transaction as described in FIG. 5, runs in conjunction with operating system 240 and provides output calls to operating system 240 which implements the various functions to be performed by application 242. Read only memory (ROM) 216 is coupled to system bus 212 and includes a basic input/output system ("BIOS") that controls certain basic functions of data processing system 213. Random access memory (RAM) 214, I/O adapter 218, and communications adapter 234 are also coupled to system bus 212. It should be noted that software components including operating system 240 and application 242 are loaded into RAM 214 which is the computer system's main memory. 110 adapter 218 may be a small computer system interface ("SCSI") adapter that communicates with disk units 220, e.g., disk drive, and tape drives 250. It is noted that the program for controlling information gathered by data collection agencies in an electronic transaction as described in FIG. 5 may also reside in web browser 121 which may reside in disk units 220 or application 242. Communications adapter 234 interconnects bus 212 with the Internet 130 enabling client 120 to communicate with the Internet 130. Input/Output devices are also connected to system bus 212 via a user interface adapter 222 and a display adapter 236. Keyboard 224, trackball 228, mouse 226 and speaker 230 are all interconnected to bus 212 through user interface adapter 222. Event data may be input to client 120 through any of these devices. A display monitor 238 is connected to system bus 212 by display adapter 236. In this manner, a user is capable of inputting to client 120 through keyboard 224, trackball 228 or mouse 226 and receiving output from client 120 via display 238 or speaker 230.

Preferred implementations of the invention include implementations as a computer system programmed to execute the method or methods described herein, and as a computer program product. According to the computer system implementations, sets of instructions for executing the method or methods are resident in the random access memory 214 of one or more computer systems configured generally as described above. Until required by client 120, the set of instructions may be stored as a computer program product in another computer memory, for example, in disk drive 220 (which may include a removable memory such as an optical disk or floppy disk for eventual use in disk drive 220). Furthermore, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 3:
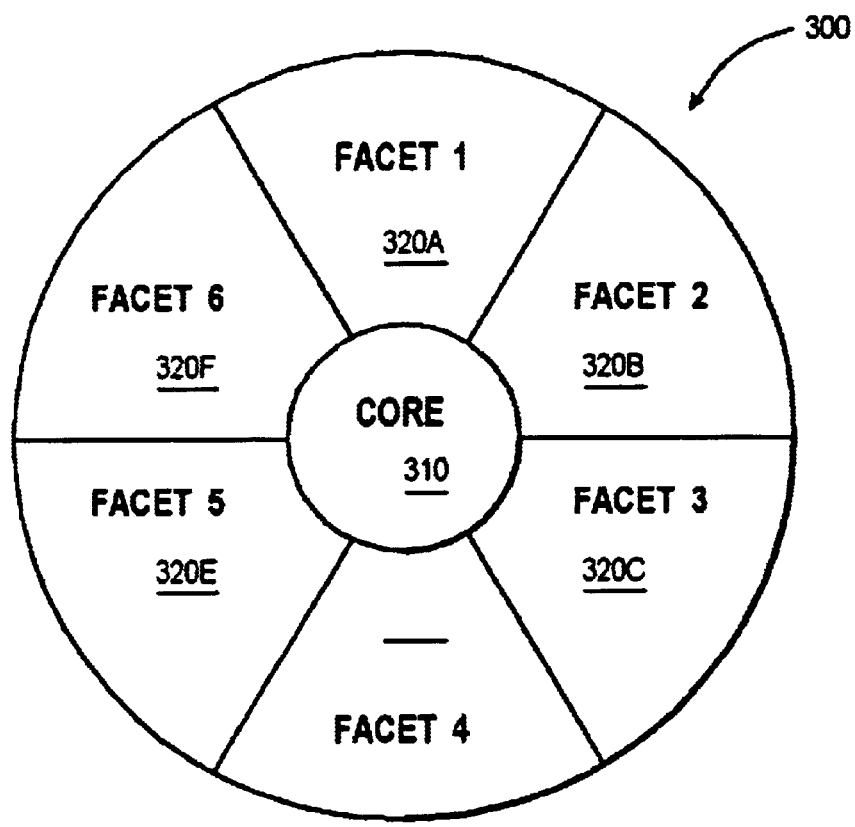
FIG. 3 illustrates a pictorial representation of an embodiment of the present invention of a persona object.

FIG. 3—Persona Object

FIG. 3 illustrates a pictorial representation of a persona object 300 according to an embodiment of the present invention. A persona object 300 may be characterized as an object representing various facets 320A–F of an individual's personalities, traits or interests. Persona object 300 may further comprise a core persona 310 that comprises the individual's most sensitive information, e.g., credit card number, social security number, private key, public key, unique key, name, e-mail address, date of birth, payment method. Facets 320A–F may collectively or individually be referred to as facets 320 or facet 320. It is noted the persona object 300 may comprise any number of facets 320 and that FIG. 3 is used for illustrative purposes. It is further noted that an instance of persona object 300 may be a data structure as illustrated in FIG. 4 that may be stored in application 242, web browser 121, or in any storage medium, e.g., disk units 220, smart card.

Figure 4:
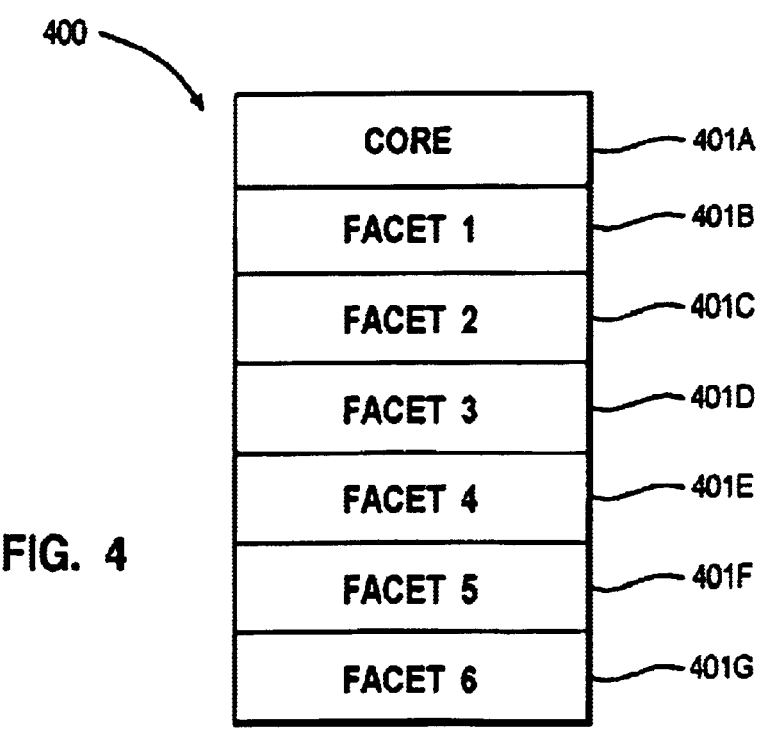
FIG. 4 is a schematic representation of a data structure of a persona object.

FIG. 4 illustrates a schematic representation of a data structure 400 of persona object 300. Data structure 400 may comprise a plurality of fields 401A–G which may store core persona 310 and facets 320A–F, respectively. Fields 401A–G may collectively or individually be referred to as fields 401 or field 401. It is noted that data structure 400 may comprise any number of fields 401 and that FIG. 4 is used for illustrated purposes only.

Referring to FIG. 3, persona object 300 may comprise facets 320 of an individual's personalities, traits or interests. For example, facet 320A may represent an individual's interest in hobbies. Facet 320B may represent an individual's interest in shopping. Facet 320C may represent an individual's interest in cars. Facet 320D may represent an individual's interest in computers. Facet 320E may represent an individual's interest in adult entertainment.

Facets 320 may comprise particular user selected information, e.g., name, e-mail address, unique key, public key, private key, payment method, that may be necessary to complete an electronic transaction between client 120 and the web site accessed via web browser 121. The particular information selected by the user may be exposed during the electronic transaction. Facets 320 may further comprise customer resource data. Customer resource data may refer to information that may be gathered by data collection agencies and distributed to marketers who deduce the user's interest or buying habits from that data. Each facet 320 may comprise different information that an individual wants to expose to a particular web sit. For example, facet 320E, e.g., adult entertainment interest, may only comprise the user's unique key and not the user's name, e-mail address, or other personal identification. That is, a user when accessing a web site that deals with adult entertainment may only expose the information in facet 320E, e.g., adult entertainment interest, to thereby protect the user's privacy. A detailed description of how facets may be implemented in an electronic transaction is described in connection with FIG. 5.

As stated above, core facet 310 may comprise an individual's most sensitive information, e.g., credit card number, social security number, private key, public key, unique key, name, e-mail address, date of birth, payment method. The user may expose selected pieces of information in core facet 310 in electronic transactions if the user desires.

It is noted that all the information associated with facets 320 and core facet 310 may be encrypted. It is further noted that the information associated with facets 320 and core facet 310 may be stored in a database, e.g., web browser directory.

Figure 5:
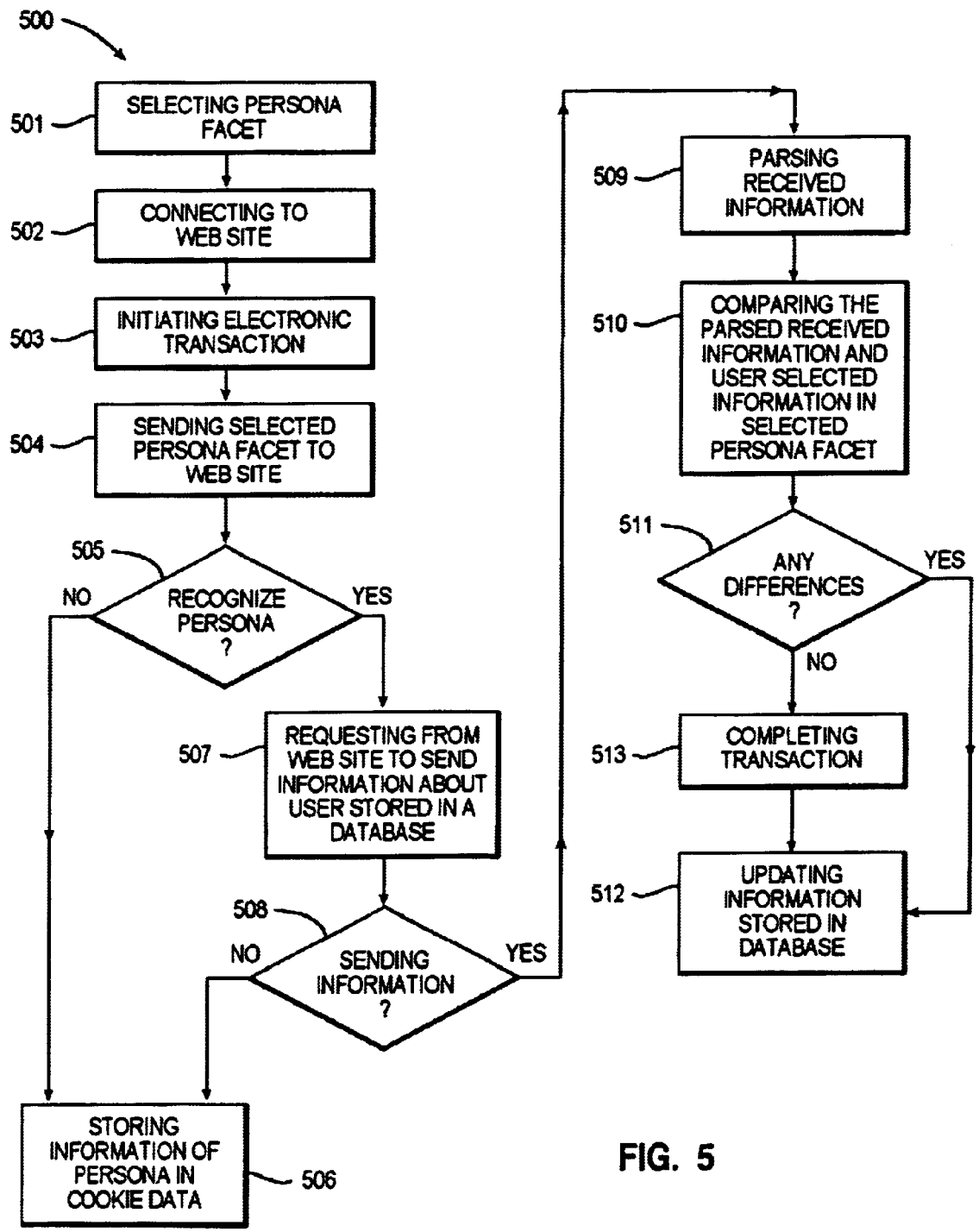
FIG. 5 is a flowchart of a method for controlling information gathered by data collection agencies in an electronic transaction.

FIG. 5—Method for Controlling Information Gathered by Data Collection Agencies in an Electronic Transaction FIG. 5 illustrates a flowchart of one embodiment of the present invention of a method 500 for controlling information gathered by data collection agencies in an electronic transaction. As stated in the Background Information section, the data collected on a user purchasing goods or services in an electronic transaction by data collection agencies and sold to marketers may be inaccurate. Furthermore, the user may not want marketers to obtain certain information. It would therefore be desirable to develop a system and method whereby data gathered by data collection agencies and distributed to marketers are more accurate. It would further be desirable to develop a system and method that limits the information that may become available to data collection agencies and sold to marketers if the user wishes. Method 500 is a method whereby the user may improve the accuracy of the data collected by data collection agencies as well as limiting the information that may become available to data collection agencies and sold to marketers.

In step 501, a user of client 120 selects a particular persona facet 320, e.g., facet 320A, prior to initiating an electronic transaction. In one embodiment, the user may select a particular persona facet 320, e.g., facet 320A, by user dialogs. A dialog may comprise a list of all currently defined facets 320 providing the user an option to select a particular facet 320, e.g., facet 320A, out of the list of currently defined facets 320. As stated above, each particular facet 320, e.g., facet 320A, may comprise user selectable information that will be exposed in the electronic transaction. For example, a particular facet 320, e.g., facet 320A (hobbies), may comprise a name, e-mail address, unique key, public key, private key, customer resource data, and payment method. If the user wants to access an adult entertainment web site, then the user may select facet 320E (adult entertainment interest) which may only comprise the user's unique key and a fake name so as to protect the user's privacy. It is noted for clarity that the user may alter the information exposed in each particular facet 320. In one embodiment, a user may alter the information exposed in each particular facet 320 via user dialogs. It is further noted that in one embodiment, a particular persona facet 320 may be designated as a default facet 320. That is, the default facet 320 may be automatically selected if the user did not select a particular persona facet 320.

In step 502, the user of client 120 connects to a particular web site by web browser 121. In step 503, the user of client 120 initiates an electronic transaction. In step 504, the user sends the particular persona facet 320 selected in step 501 to the web site by web browser 212. In one embodiment, the particular persona facet 320 may be sent in binary data. A determination is then made in step 505 as to whether the web site recognizes the persona facet 320 sent in step 504. In one embodiment, the web site may receive a cookie from web browser 121 and if the web site recognizes the user of web browser 121 then the web site may search a database for the persona facet 320 sent by the user. If the web site does not recognize the particular persona facet 320 sent in step 504, then the user selected information in the particular persona facet 320 is stored in the cookie data in step 506. A detailed description of incorporating the user selected information in the particular persona facet 320 in cookie data is described in U.S. application Ser. No. 09/461,507, filed on Dec. 14, 1999, entitled "Web Marketing Personas," which is hereby incorporated herein by reference in its entirety.

If the web site does recognize the particular persona facet 320 sent in step 504, then the user of client 120 requests from the web site the information, i.e., information collected by data agencies and distributed to marketers, about the user stored in a database, e.g., customer resource management database, in step 507. A determination is then made in step 508 as to whether the web site sent the information, i.e., information collected by data agencies and distributed to marketers, about the user that was stored in a database, e.g., customer resource management database.

If the web site did not send the information, i.e., information collected by data agencies and distributed to marketers, about the user that was stored in a database, e.g., customer resource management database, then the user selected information in the particular persona facet 320 is stored in the cookie data in step 506. If the web site did send the information, i.e., information collected by data agencies and distributed to marketers, about the user that was stored in a database, e.g., customer resource management database, then the received information is parsed in step 509.

In step 510, a comparison is made between the parsed received information in step 509 and the user selected information in the particular persona facet 320. In step 511, a determination is made as to whether there are any differences between the parsed received information in step 509 and the user selected information in the particular persona facet 320. If there are no differences, then the transaction is completed in step 513. If there are differences, then the database, e.g., customer resource management database, is updated to only include the user selected information in step 512. By updating the database, e.g., consumer resource management database, the information gathered by data collection agencies and distributed to marketers may be more accurate as well as limited according to the user's wishes. Upon updating the database, e.g., customer resource management database, the electronic transaction is completed in step 513.

Referring to step 513, the electronic transaction may be completed by the web browser 121 of client 120 initiating a method call (as in Java) to the web site from web browser 121 to expose a particular payment method, e.g., credit card number, included within the user selected information of the selected persona facet 320. By sending a request to expose a particular payment method, e.g., credit card number, included within the user selected information of the selected persona facet 320 as opposed to sending the particular payment method, e.g., credit card number, over the Internet, secrecy may be improved by reducing exposure of sensitive data. It is noted that all types of information, i.e., user selected information in persona facet 320 as well as sensitive information in core persona 310, may be exposed by a method call from web browser 121 of client 120 to the web site instead of actually sending the information over the Internet thereby reducing chances of fraud and identity theft. It is further noted that all the information associated with facets 320 and core facet 310 may be encrypted.

It is noted that the particular core persona 320, e.g., facet 320A, may be replaced with core persona 310 in method 500. That is, the user of client 120 may want to select and send the user's most sensitive information included within core persona 310 instead of the user's selected information within a particular persona facet 320, e.g., facet 320A, for the electronic transaction.

Although the method, system and computer program product of the present invention are described in connection with several embodiments, it is not intended to be limited to the specific forms set forth herein, but on the contrary, it is intended to cover such alternatives, modifications, and equivalents, as can be reasonably included within the spirit and scope of the invention as defined by the appended claims. It is noted that the headings are used only for organizational purposes and not meant to limit the scope of the description or claims.

What is claimed is:

1. A method for controlling information gathered by data collection agencies in an electronic transaction comprising the steps of:

selecting a persona facet by a user, wherein said persona facet selected comprises a user selectable information selected by the user to be exposed in said electronic transaction;

connecting to a web site by a web browser;

sending said selected persona facet to said web site by said web browser during said electronic transaction;

receiving information about said user stored in a database from said web site if said web site recognizes said persona facet; and updating said information about said user stored in said database.

2. The method as recited in claim 1 further comprising the step of:

comparing said user selectable information in said persona facet with said received information from said web site.

3. The method as recited in claim 2, wherein said comparing said user selectable information in said persona facet with said received information from said web site comprises the step of parsing said information received from said web site.

4. The method as recited in claim 2, wherein if there are differences between said information received from said web site and said user selectable information in said persona facet from said comparison then said information about said user stored in said database is updated.

5. The method as recited in claim 1, wherein said web site determines if said web site recognizes said persona facet by searching a database for said persona facet.

6. The method as recited in claim 1 further comprising the step of:

completing said electronic transaction.

7. The method as recited in claim 6, wherein said user selectable information comprises a particular payment method.

8. The method as recited in claim 7, wherein said electronic transaction is completed by initiating a method call to said web site from said web browser to expose said particular payment method.

9. The method as recited in claim 1, wherein said user selectable information comprises at least one of the following: user name, electronic mail address, public key, private key, unique key, payment method, and customer resource data.

10. The method as recited in claim 1 further comprising the step of:
    determining whether said selected persona facet is recognized by said web site, wherein if said web site does not recognize said selected persona faucet then said user selectable information is stored in cookie data.

11. The method as recited in claim 1 further comprising the step of:
    determining whether said selected persona facet is recognized by said web site, wherein if said web site recognizes said selected persona facet then said user requests from said web site to send said information about said user stored in said database.

12. The method as recited in claim 11, wherein if said web site does not send said information about said user stored in said database then the method further comprises the step of:
    storing said user selectable information in cookie data.

13. A computer program product having computer readable medium having computer program logic recorded thereon for controlling information gathered by data collection agencies in an electronic transaction, comprising:
    programming operable for selecting a persona facet by a user, wherein said persona facet selected comprises a user selectable information selected by the user to be exposed in said electronic transaction;
    programming operable for connecting to a web site by a web browser;
    programming operable for sending said selected persona facet to said web site by said web browser during said electronic transaction;
    programming operable for receiving information about said user stored in a database from said web site if said web site recognizes said persona facet; and
    programming operable for updating said information about said user stored in said database.

14. The computer program product as recited in claim 13 further comprises:
    programming operable for comparing said user selectable information in said persona facet with said received information from said web site.

15. The computer program product as recited in claim 14, wherein said comparing said user selectable information in said persona facet with said received information from said web site comprises:
    programming operable for parsing said information received from said web site.

16. The computer program product as recited in claim 14, wherein if there are differences between said information received from said web site and said user selectable information in said persona facet from said comparison then said information about said user stored in said database is updated.

17. The computer program product as recited in claim 13, wherein said web site determines if said web site recognizes said persona facet by searching a database for said persona facet.

18. The computer program product as recited in claim 13 further comprises:
    programming operable for completing said electronic transaction.

19. The computer program product as recited in claim 18, wherein said user selectable information comprises a particular payment method.

20. The computer program product as recited in claim 19, wherein said electronic transaction is completed by initiating a method call to said web site from said web browser to expose said particular payment method.

21. The computer program product as recited in claim 13, wherein said user selectable information comprises at least one of the following: user name, electronic mail address, public key, private key, unique key, payment method, and customer resource data.

22. The computer program product as recited in claim 13 further comprises:
    programming operable for determining whether said selected persona facet is recognized by said web site, wherein if said web site does not recognize said selected persona facet then said user selectable information is stored in cookie data.

23. The computer program product as recited in claim 13 further comprises:
    programming operable for determining whether said selected persona facet is recognized by said web site, wherein if said web site recognizes said selected persona facet then said user requests from said web site to send said information about said user stored in said database.

24. The computer program product as recited in claim 23, wherein if said web site does not send said information about said user stored in said database then the computer program product further comprises:
    programming operable for storing said user selectable information in cookie data.

25. A system comprising:
    a processor;
    a memory unit operable for storing a computer program operable for controlling information gathered by data collection agencies in an electronic transaction; and
    a bus system coupling the processor to the memory, wherein the computer program is operable for performing the following programming steps:
        selecting a persona facet by a user, wherein said persona facet selected comprises a user selectable information selected by the user to be exposed in said electronic transaction;
        connecting to a web site by a web browser;
        sending said selected persona facet to said web site by said web browser during said electronic transaction;
        receiving information about said user stored in a database from said web site if said web site recognizes said persona facet; and
        updating said information about said user stored in said database.

26. The system as recited in claim 25, wherein the computer program is further operable to perform the programming step:
    comparing said user selectable information in said persona facet with said received information from said web site.

27. The system as recited in claim 26, wherein said comparing said user selectable information in said persona facet with said received information from said web site comprises the programming step:
    parsing said information received from said web site.

28. The system as recited in claim 26, wherein if there are differences between said information received from said web site and said user selectable information in said persona facet from said comparison then said information about said user stored in said database is updated.

29. The system as recited in claim 25, wherein said web site determines if said web site recognizes said persona facet by searching a database for said persona facet.

30. The system as recited in claim 25, wherein the computer program product is further operable to perform the programming step:

completing said electronic transaction.

31. The system as recited in claim 30, wherein said user selectable information comprises a particular payment method.

32. The system as recited in claim 31, wherein said electronic transaction is completed by initiating a method call to said web site firm said web browser to expose said particular payment method.

33. The system as recited in claim 25, wherein said user selectable information comprises at least one of the following: user name, electronic mail address, public key, private key, unique key, payment method, and customer resource data.

34. The system as recited in claim 25, wherein the computer program is further operable to perform the programming step:

determining whether said selected persona facet is recognized by said web site, wherein if said web site does not recognize said selected persona facet then said user selectable information is stored in cookie data.

35. The system as recited in claim 25, wherein the computer program is further operable to perform the programming step:

determining whether said selected persona facet is recognized by said web site, wherein if said web site recognizes said selected persona facet then said user requests from said web site to send said information about said user stored in said database.

36. The system as recited in claim 35, wherein if said Web site does not send said information about said user stored in said database then the computer program is further operable to perform the programming step:

storing said user selectable information in cookie data.

* * * * *